US012668213B2

(12) United States Patent
Jung

(10) Patent No.: US 12,668,213 B2
(45) Date of Patent: Jun. 30, 2026

(54) DISPLACEMENT DETECTION SYSTEM AND DISPLACEMENT DETECTION METHOD FOR BRAKE PEDAL

(71) Applicant: HL Mando Corporation, Pyeongtaek-si (KR)

(72) Inventor: Jaehun Jung, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 174 days.

(21) Appl. No.: 18/385,094

(22) Filed: Oct. 30, 2023

(65) Prior Publication Data

US 2024/0425020 A1     Dec. 26, 2024

(30) Foreign Application Priority Data

Mar. 8, 2023     (KR) ........................ 10-2023-0030348

(51) Int. Cl.
B60T 7/04     (2006.01)
G01D 5/14     (2006.01)
G01D 18/00     (2006.01)

(52) U.S. Cl.
CPC .............. B60T 7/042 (2013.01); G01D 5/145 (2013.01); G01D 18/00 (2013.01); B60T 2220/04 (2013.01); B60T 2270/82 (2013.01); G01D 2205/18 (2021.05)

(58) Field of Classification Search
CPC .. B60T 7/042; B60T 2220/04; B60T 2270/82; G01D 18/00; G01D 2205/18
USPC ........ 303/3, 15, 20; 701/70–72; 73/121, 129
See application file for complete search history.

(56) References Cited

U.S. PATENT DOCUMENTS 12,296,811 B2 *   5/2025   Wagner ................... B60T 8/409
2008/0312801 A1 *  12/2008   Muller ................... G01B 7/003
                                                                701/71

FOREIGN PATENT DOCUMENTS

WO     WO-2010003839 A1 *   1/2010   .............. B60T 11/18

* cited by examiner

*Primary Examiner* — Christopher P Schwartz
(74) *Attorney, Agent, or Firm* — Harvest IP Law, LLP

(57)     ABSTRACT

Disclosed herein is a displacement detection system for a brake pedal. The system includes a displacement detection device including a pedal wake up sensor detecting the change in magnetic flux to generate a wake up signal for activating a control device, and a pedal travel sensor having a plurality of detectors that independently detect the magnetic flux, and detecting a change in magnetic flux to measure a stroke of the brake pedal, and is configured to verify reliability of a measurement value that is measured by each of the plurality of detectors of the pedal travel sensor using a measurement value of the pedal wake up sensor.

20 Claims, 6 Drawing Sheets

DISPLACEMENT DETECTION SYSTEM AND DISPLACEMENT DETECTION METHOD FOR BRAKE PEDAL

CROSS-REFERENCE TO RELATED APPLICATIONS

This application claims is based on, and claims priority from Korean Patent Application No. 10-2023-0030348, filed on Mar. 8, 2023, the disclosure of which is hereby incorporated by reference herein in its entirety.

TECHNICAL FIELD

The present disclosure relates to a displacement detection system and a displacement detection method for a brake pedal and, more particularly, to a displacement detection system and a displacement detection method for a brake pedal, which can accurately measure the displacement or stroke of the brake pedal.

BACKGROUND

A brake system for braking is essentially installed in a vehicle. Various types of systems have been proposed to obtain a more stable and effective braking force according to various operating conditions of the vehicle.

Generally, a conventional brake system supplies hydraulic pressure required for braking to a wheel cylinder using a mechanically connected booster when a driver depresses a brake pedal. However, recently, an electronic brake system has been widely used, in which a pedal stroke sensor or pedal travel sensor detects the movement of the brake pedal when a driver steps on the brake pedal, and the system receives the driver's will to brake in an electric signal, on the basis of the detected result, and then supplies the hydraulic pressure required for braking to the wheel cylinder, thus allowing a braking force to be precisely controlled.

Such a pedal stroke sensor is installed on the brake pedal or a master cylinder connected thereto to detect the displacement of the brake pedal that is translated or rotated by a driver's pedal effort. However, this is problematic in that it is impossible to output normal braking when the sensor for detecting the displacement of the brake pedal is defective or malfunctions due to an external environment.

SUMMARY

In view of the above, the present disclosure provides a displacement detection system and a displacement detection method for a brake pedal, which can reliably maintain the measurement accuracy of the displacement or stroke of the brake pedal.

The present disclosure provides a displacement detection system for a brake pedal, the system including a shaft moving in conjunction with a movement of the brake pedal, a magnet supported on a shaft to generate a magnetic field, a displacement detection device detecting a change in magnetic flux according to a movement of the magnet, and a control device generating a brake control signal according to a measurement value of the displacement detection device. The displacement detection device includes a pedal wake up sensor detecting the change in magnetic flux to generate a wake up signal for activating the control device, and a pedal travel sensor having a plurality of detectors that independently detect the magnetic flux, and detecting a change in magnetic flux to measure a stroke of the brake pedal.

Further, the control device is configured to verify reliability of a measurement value that is measured by each of the plurality of detectors of the pedal travel sensor using a measurement value of the pedal wake up sensor.

The control device may compare the measurement values measured by the plurality of detectors of the pedal travel sensor when the measurement values are different from each other with the measurement value of the pedal wake up sensor to determine a highly reliable measurement value The pedal wake up sensor may detect displacement at each preset distance, and the control device may compare the measurement value of the pedal wake up sensor with the measurement value measured by each of the plurality of detectors of the pedal travel sensor whenever the pedal wake up sensor detects the displacement, thus verifying the reliability.

The control device may determine that the detector in which the measurement value is generated is defective if the measurement value is generated among the plurality of detectors of the pedal travel sensor before the pedal wake up sensor generates a wake up signal.

The pedal wake up sensor may include a plurality of Hall switch sensors installed at a preset distance, and may detect the displacement while the Hall switch sensor is turned on by the movement of the magnet.

The pedal travel sensor may be a Hall integrated circuit, and, as the magnet moves, the Hall integrated circuit may detect a change in magnetic flux and generate an electric signal corresponding to a change amount of the magnetic flux.

The displacement detection device may further include a printed circuit board on which the plurality of Hall switch sensors that are the pedal wake up sensor and the Hall integrated circuit that is the pedal travel sensor are mounted, and a housing accommodating the printed circuit board therein.

The magnet may move while facing the plurality of Hall switch sensors and the Hall integrated circuit that are mounted on the printed circuit board A plurality of magnets may be arranged opposite to each other in a moving direction.

The shaft and the magnet may be accommodated in a shaft bore formed in a hydraulic block that is provided with a plurality of paths and valves to control a flow of a working fluid.

The displacement detection device may be mounted on an outside of the hydraulic block.

Further, the present disclosure provides a displacement detection method for a brake pedal that detects a change in magnetic flux according to a movement of a magnet supported on a shaft moving in conjunction with a movement of the brake pedal to generate a magnetic field, the method including detecting the change in magnetic flux through a pedal wake up sensor to generate a wake up signal for activating the control device, and detecting a change in magnetic flux to measure a stroke of the brake pedal through a pedal travel sensor having a plurality of detectors that independently detect the magnetic flux, and verifying reliability of a measurement value that is measured by each of the plurality of detectors of the pedal travel sensor using a measurement value of the pedal wake up sensor.

The measurement values measured by the plurality of detectors of the pedal travel sensor when the measurement values are different from each other may be compared with the measurement value of the pedal wake up sensor to determine a highly reliable measurement value.

The pedal wake up sensor may detect displacement at each preset distance, and the measurement value of the pedal wake up sensor may be compared with the measurement value measured by each of the plurality of detectors of the pedal travel sensor whenever the pedal wake up sensor detects the displacement, thus verifying the reliability.

It may be determined that the detector in which the measurement value is generated is defective if the measurement value is generated among the plurality of detectors of the pedal travel sensor before the pedal wake up sensor generates a wake up signal.

The pedal wake up sensor may include a plurality of Hall switch sensors installed at a preset distance, and detect the displacement as the Hall switch sensor is turned on by the movement of the magnet.

The pedal travel sensor may be a Hall integrated circuit, and, as the magnet moves, the Hall integrated circuit may detect a change in magnetic flux and may generate an electric signal corresponding to a change amount of the magnetic flux.

The pedal wake up sensor may include a plurality of Hall switch sensors mounted on a printed circuit board, and the pedal travel sensor may be a Hall integrated circuit mounted on the printed circuit board.

The magnet may move while facing the plurality of Hall switch sensors and the Hall integrated circuit that are mounted on the printed circuit board A plurality of magnets may be arranged opposite to each other in a moving direction.

Advantageous Effects

According to an embodiment of the present disclosure, a displacement detection system for a brake pedal can reliably maintain the measurement accuracy of the displacement or stroke of the brake pedal.

Further, according to another embodiment of the present disclosure, a displacement detection system for a brake pedal can reliably maintain the measurement accuracy of the displacement or stroke of the brake pedal.

DETAILED DESCRIPTION

Figure 1:
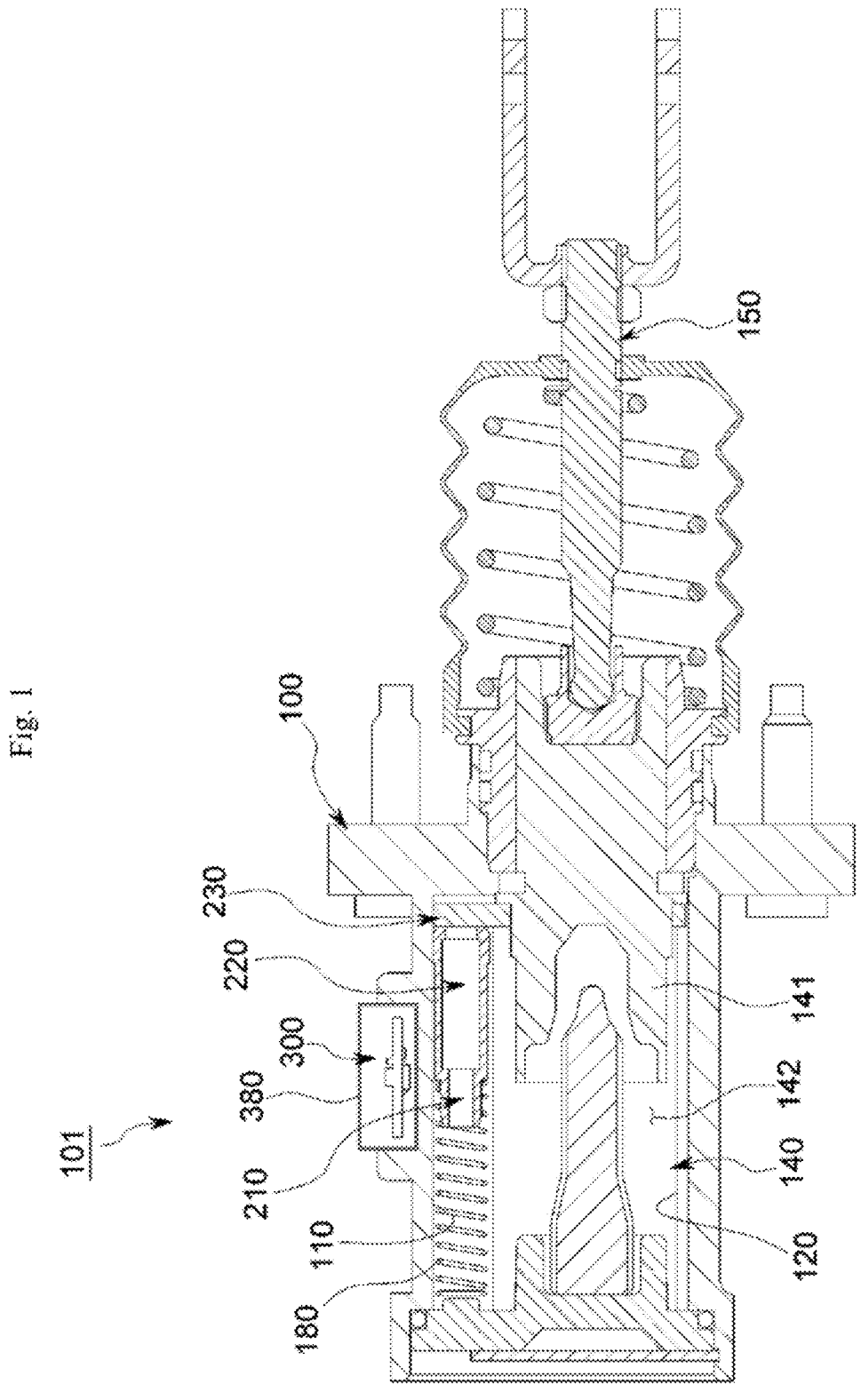
FIG. 1 is a lateral sectional view showing a state in which a displacement detection system for a brake pedal is mounted, according to an embodiment of the present disclosure.

Hereinafter, embodiments of the present disclosure will be described in detail with reference to the accompanying drawings such that those skilled in the art can easily practice the present disclosure. However, the present disclosure may be implemented in various ways without being limited to particular embodiments described herein.

It is to be noted that the drawings are schematic and are not drawn to scale. Furthermore, the size or shape of components shown in the drawings may be exaggerated for the clarity and convenience of description. Any dimensions are merely illustrative and not restrictive. In addition, the same reference numerals are used throughout the drawings to designate the same or similar components.

The disclosure specifically represents an ideal embodiment of the present disclosure. Thus, various variations of the diagram are expected. Therefore, the embodiment is not limited to a specific shape, and also covers the modification of the shape by manufacturing.

Further, unless otherwise defined, all terms including technical and scientific terms used herein have the same meaning as commonly understood by one of ordinary skill in the art to which the present disclosure belongs. The terminology used herein is for the purpose of more clearly describing the present disclosure and is not intended to be limiting.

Further, expressions "comprise", "include", "have", etc. when used in this specification, should be understood as open-ended terms, which encompass the possibility of including other embodiments, unless stated otherwise in a phrase or sentence.

In the present disclosure, the singular forms are intended to include the plural forms as well, unless the context clearly indicates otherwise. The same applies to the singular forms in the claims.

It will be understood that, although the terms "first", "second", etc. may be used herein to describe various elements, these elements should not be limited by these terms. These terms are only used to distinguish one element from another element.

Hereinafter, a displacement detection system 101 for a brake pedal according to the present disclosure will be described in detail with reference to FIGS. 1 to 3.

Figure 2:
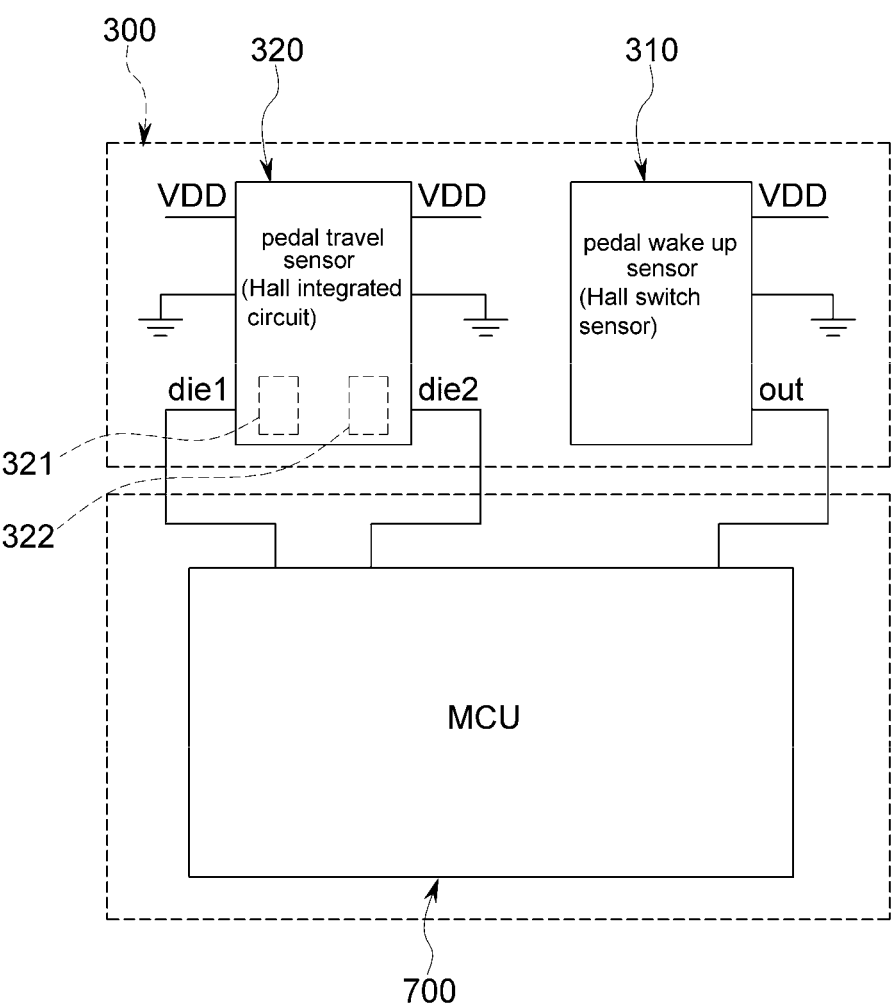
FIG. 2 is a configuration diagram showing a displacement detection device and a control device used in the displacement detection system for the brake pedal of FIG. 1.
Figure 3:
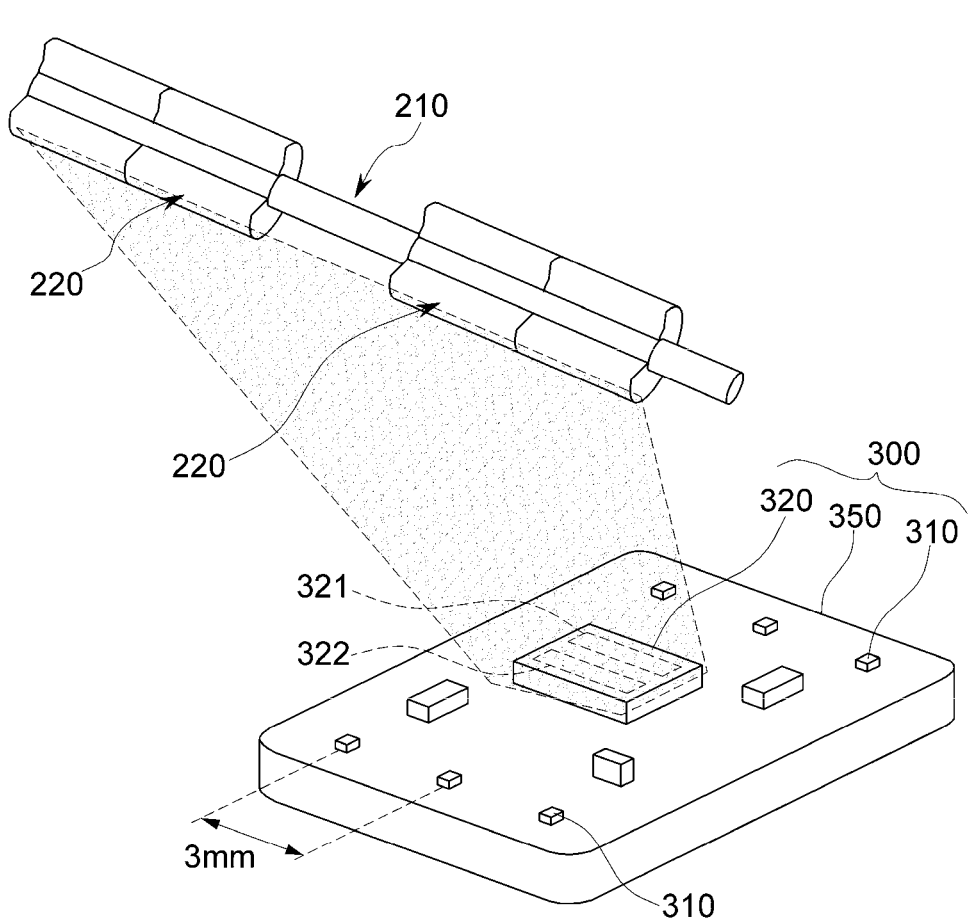
FIG. 3 is a perspective view showing the arrangement of a shaft, a magnet, and the displacement detection device used in the displacement detection system for the brake pedal of FIG. 1.

FIG. 1 is a lateral sectional view showing a state in which the displacement detection system for the brake pedal is mounted, according to an embodiment of the present disclosure, FIG. 2 is a configuration diagram showing a displacement detection device 300 and a control device 700 used in the displacement detection system for the brake pedal, and FIG. 3 is a perspective view showing the arrangement of a shaft 210, a magnet 220, and the displacement detection device 300 used in the displacement detection system for the brake pedal.

FIG. 1 is a lateral sectional view showing a state in which the displacement detection system 101 for the brake pedal is mounted on a hydraulic block 100, according to an embodiment of the present disclosure.

As shown in FIG. 1, the displacement detection system 101 for the brake pedal according to an embodiment of the present disclosure may be mounted on the hydraulic block 100. The hydraulic block 100 may be provided with a master cylinder 140 and a control device 700, and may include a plurality of paths and valve bores to control the flow of a working fluid, such as brake oil, generating hydraulic pressure therein. The hydraulic block 100 may be provided with a cylinder bore 120 in which a piston 141 of the master cylinder 140 is accommodated, and a shaft bore 110 in which a magnet 220 and a shaft 210 that will be described later are accommodated. The piston 141 may be accommodated in the cylinder bore 120 to be movable forward and backward, and the magnet 220 and the shaft 210 may be accommodated in the shaft bore 110 to be movable forward and backward along with the piston 141.

An input rod 150 may be connected at one end thereof to the brake pedal and connected at the other end to the piston 141 so that the operation of the brake pedal may be transmitted as the displacement of the piston 141.

The master cylinder 140 may include the piston 141 that is connected to the brake pedal via the input rod 150 to be displaced in the cylinder bore 120 as the brake pedal is operated, and a pressure chamber 142 that is defined in the cylinder bore 120 to change a volume by the displacement of the piston 141 and thereby create the hydraulic pressure of working fluid contained therein or create a negative pressure.

When a driver applies a pedal effort to the brake pedal, the piston 141 may move forward to reduce the volume of the pressure chamber 142 partitioned and defined by the cylinder bore 120, thereby pressing the working fluid contained in the pressure chamber 142 and creating the hydraulic pressure. In contrast, when the driver releases the pedal effort from the brake pedal, the shaft 210 returns to an original position thereof by a restoring spring 180, and the piston 141 moving together with the shaft 210 also returns to an original position thereof, thus increasing the volume of the pressure chamber 142 and consequently releasing the hydraulic pressure of the working fluid contained in the pressure chamber 142 or creating the negative pressure. On the other hand, an embodiment of the present disclosure is not limited thereto, but the restoring spring 180 may directly elastically press and restore the piston 141 instead of the shaft 210.

The shaft bore 110 may be provided in the hydraulic block 100 to be connected to or communicate with the cylinder bore 120, so that the shaft 210 and the magnet 220 that will be described later may slide in the shaft bore 110. Similarly to the cylinder bore 120, the shaft bore 110 may extend in a direction parallel to the moving direction of the piston 141. As the cylinder bore 120 in which the piston 141 slides and the shaft bore 110 in which the shaft 210 and the magnet 220 slide are provided in the hydraulic block 100 to be connected or communicate without being sealed to each other, a separate sealing member for sealing a gap between the cylinder bore 120 and the shaft bore 110 is not required, so that the number of components may be reduced, and further, the manufacturing process for forming the cylinder bore 120 and the shaft bore 110 in the hydraulic block 100 may be simplified, thus reducing the manufacturing cost of a product and improving productivity.

In addition, the cylinder bore 120 and the shaft bore 110 are formed in the hydraulic block 100 to be adjacent to each other, thus reducing the overall size of the hydraulic block 100 and thereby achieving reduction in size and weight of a product.

As shown in FIG. 1, the displacement detection system 101 for the brake pedal according to an embodiment of the present disclosure includes the shaft 210, the magnet 220, the displacement detection device 300, and the control device 700 (see FIG. 2).

The displacement detection system 101 for the brake pedal according to an embodiment of the present disclosure may further include a mounting member 230.

The shaft 210 moves in conjunction with the movement of the brake pedal. To be more specific, the shaft 210 may extend in a direction parallel to the moving direction of the piston 141 of the master cylinder 140 that is displaced by the operation of the brake pedal. Further, the shaft may be accommodated in the shaft bore 110 of the hydraulic block 100 together with the magnet 220, which will be described later, to move forward and backward. In this case, the shaft 210 is coupled to the piston 141 by the mounting member 230 that will be described later, so that the shaft may be moved together with the piston 141 by the operation of the brake pedal.

The magnet 220 is made of a magnetic material to generate a magnetic field. The piston 141 may be moved forward and backward by the operation of the brake pedal to generate the displacement, and the magnet 220 may also be moved forward and backward in conjunction with the piston 141 together with the shaft 210. As the magnet 220 moves, the displacement detection device 30) that will be described later may detect the stroke of the brake pedal based on the displacement amount of the piston 141 by detecting a change in magnetic force or a change in magnetic flux density of the magnet 220. The magnet 220 may be fixedly installed on the outer circumference of the shaft 210 through various methods such as press-fitting, bolting, and bonding.

On the other hand, a plurality of magnets 220 may be arranged opposite to each other in the moving direction to be supported on the shaft, so that the displacement detection device 300 that will be described later may precisely measure the displacement of the piston 141 and the stroke of the brake pedal on the basis of the overlapping value of the magnetic force or magnetic flux density of the magnet 220. For example, when a pair of magnets 220 is provided, it may be necessary to form a gap between the plurality of magnets 220 so that the displacement detection device 300 may more precisely measure the overlapping value of the magnetic force or the magnetic flux density by the pair of magnets 220.

The mounting member 230 may be provided to connect the piston 141 and the shaft 210 so that the piston 141 and the shaft 210 may be integrally operated.

The displacement detection device 300 detects a change in magnetic flux as the magnet 220 moves.

To be more specific, in an embodiment of the present disclosure, the displacement detection device 300 includes a pedal wake up sensor 310 and a pedal travel sensor 320. Further, the pedal wake up sensor 310 and the pedal travel sensor 320 may be integrated to form a single displacement detection device 300.

The pedal wake up sensor 310 detects the change in magnetic flux to generate a wake up signal for activating the control device 700 that will be described later.

For example, the wake up signal may refer to an activation command signal for an electronic brake system. When the electronic brake system is implemented in a vehicle, the wake up signal may be generated not only when the ignition of the vehicle is turned on but also when a user steps on the brake pedal.

The pedal wake up sensor 310 may be a plurality of Hall switch sensors installed at a preset distance, and may detect the displacement as the Hall switch sensor is turned on by the movement of the magnet 220. By way of example, the preset distance may be 3 mm.

The pedal travel sensor 320 has a plurality of detectors 321 and 322 that independently detect the magnetic flux, and detects a change in magnetic flux to measure the stroke of the brake pedal.

The pedal travel sensor 320 may be a Hall integrated circuit. As the magnet 220 moves, the Hall integrated circuit may detect a change in magnetic flux and generate an electric signal corresponding to the change amount of the magnetic flux.

The displacement detection device 300 may further include a printed circuit board 350 on which a plurality of Hall switch sensors that are the pedal wake up sensor 310 and the Hall integrated circuit that is the pedal travel sensor 320 are mounted, and a housing 380 which accommodates and supports the printed circuit board 350 therein. That is, the plurality of Hall switch sensors that are the pedal wake up sensor 310 and the Hall integrated circuit that is the pedal travel sensor 320 may be integrally installed on one printed circuit board 350. In this case, the magnet 220 may move while facing the plurality of Hall switch sensors and the Hall integrated circuit that are mounted on the printed circuit board 350.

The displacement detection device 300 may be mounted on the outside of the hydraulic block 100. That is, the housing 380 of the displacement detection device 300 may be coupled to the outside of the hydraulic block 100.

The control device 700 may generate a brake control signal according to the measurement value of the displacement detection device 300. That is, an electronic brake system is operated in response to the brake control signal generated by the control device.

Particularly, in an embodiment of the present disclosure, the control device 700 may verify the reliability of the measurement value that is measured by each of the plurality of detectors 321 and 322 of the pedal travel sensor 320 using the measurement value of the pedal wake up sensor 310.

To be more specific, the control device 700 may compare the measurement values measured by the plurality of detectors 321 and 322 of the pedal travel sensor 320 when the measurement values are different from each other with the measurement value of the pedal wake up sensor 310 to determine a highly reliable measurement value.

That is, when the pedal wake up sensor 310 detects the displacement at each preset distance, the control device 700 compares the measurement value of the pedal wake up sensor 310 with the measurement value measured by each of the plurality of detectors 321 and 322 of the pedal travel sensor 320 whenever the pedal wake up sensor 310 detects the displacement, thus verifying the reliability.

For example, whenever the pedal wake up sensor 310 detects the displacement if the pedal wake up sensor 310 detects the displacement every 3 mm, the control device 700 may compare whether the measurement value measured by each of the plurality of detectors 321 and 322 of the pedal travel sensor 320 corresponds to the movement of 3 mm in stroke, and then determine that a detector measuring a measurement value that is out of an error range without approaching 3 mm, among the plurality of detectors 321 and 322, is defective.

Further, the control device 700 may determine that the detector in which the measurement value is generated is defective if the measurement value is generated among the plurality of detectors 321 and 322 of the pedal travel sensor 320 before the pedal wake up sensor 310 generates the wake up signal.

The fact that the wake up signal is not generated by the pedal wake up sensor 310 means that the displacement value of the pedal corresponds to 0 mm. Thus, if the measurement value is generated among the plurality of detectors 321 and 322 of the pedal travel sensor 320 before the pedal wake up sensor 310 generates the wake up signal, it may be determined that a corresponding detector is defective.

Through such a configuration, the displacement detection system 101 of the brake pedal according to an embodiment of the present disclosure can reliably maintain the accuracy of the measurement of the stroke or displacement of the brake pedal.

To be more specific, the pedal travel sensor 320 has the plurality of detectors 321 and 322 to improve the accuracy of measurement, and the measurement value measured by each of the plurality of detectors 321 and 322 of the pedal travel sensor 320 is compared with the measurement value of the pedal wake up sensor 310, thus securing the reliability.

Hereinafter, a displacement detection method for a brake pedal according to an embodiment of the present disclosure will be described. Here, the displacement detection method for the brake pedal can detect a change in magnetic flux by the movement of a magnet 220 that is supported on a shaft 210 moving in conjunction with the movement of the brake pedal to generate a magnetic field.

To be more specific, the displacement detection method for the brake pedal includes a step of detecting a change in magnetic flux through a pedal wake up sensor 310 to generate a wake up signal for activating a control device 700, a step of detecting a change in magnetic flux through a pedal travel sensor 320 having a plurality of detectors 321 and 322 independently detecting the magnetic flux to measure a stroke of the brake pedal, and a step of verifying the reliability of a measurement value measured by each of the plurality of detectors 321 and 322 of the pedal travel sensor 320 using the measurement value of the pedal wake up sensor 310.

Further, when the measurement values measured by the plurality of detectors 321 and 322 of the pedal travel sensor 320 are different from each other, each measurement value may be compared with the measurement value of the pedal wake up sensor 310, thus determining a highly reliable measurement value.

In other words, when the pedal wake up sensor 310 detects the displacement at each preset distance, the measurement value of the pedal wake up sensor 310 may be compared with the measurement value measured by each of the plurality of detectors 321 and 322 of the pedal travel sensor 320 whenever the pedal wake up sensor 310 detects the displacement, thus verifying the reliability.

For example, whenever the pedal wake up sensor 310 detects the displacement if the pedal wake up sensor 310 detects the displacement every 3 mm, it may be compared whether the measurement value measured by each of the plurality of detectors 321 and 322 of the pedal travel sensor 320 corresponds to the movement of 3 mm in stroke, and then it may be determined that a detector measuring a measurement value that is out of an error range without approaching 3 mm among the plurality of detectors 321 and 322 is defective.

Figure 4:
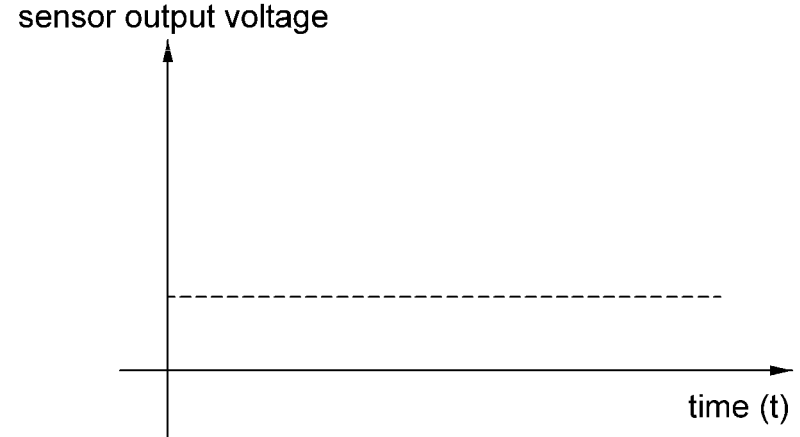
FIG. 4 is a graph showing an output voltage when a displacement is 0 mm in a pedal travel sensor used in the displacement detection system for the brake pedal of FIG. 1.
Figure 5:
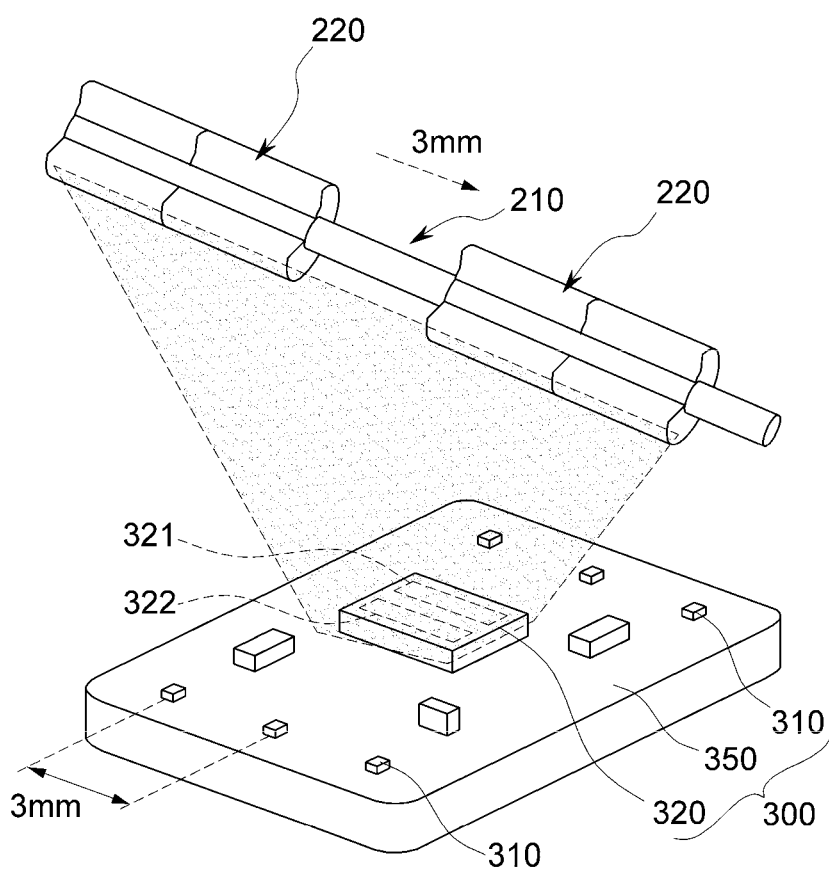
FIG. 5 is a perspective view showing the arrangement of the shaft, the magnet, and the displacement detection device when the shaft and the magnet are moved by a predetermined distance.
Figure 6:
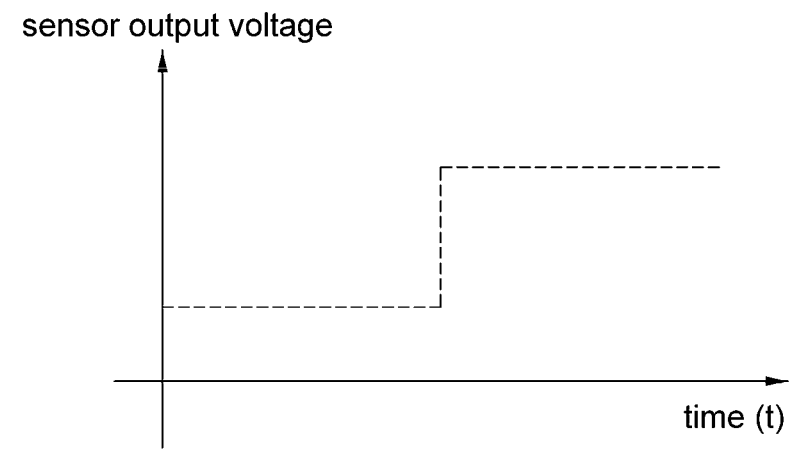
FIG. 6 is a graph showing the output voltage of the pedal travel sensor when the shaft and the magnet are moved by a predetermined distance.

FIG. 3 shows a state in which the shaft 210 and the magnet 220 do not move. In this case, the output signal of the pedal travel sensor 320 is illustrated in FIG. 4. Further, FIG. 5 shows a state in which the shaft 210 and the magnet 220 move 3 mm, for example. In this case, the output signal of the pedal travel sensor 320 is illustrated in FIG. 6.

Further, if a measurement value is generated among the plurality of detectors 321 and 322 of the pedal travel sensor 320 before the pedal wake up sensor 310 generates the wake up signal, it may be determined that the detector in which the measurement value is generated is defective.

The fact that the wake up signal is not generated by the pedal wake up sensor 310 means that the displacement value of the pedal corresponds to 0 mm. Thus, if the measurement value is generated in any one of the detectors 321 and 322 of the pedal travel sensor 320 before the pedal wake up sensor 310 generates the wake up signal, it may be determined that a corresponding detector is defective.

The pedal wake up sensor 310 used for the displacement detection method of the brake pedal may be a plurality of Hall switch sensors installed at a preset distance, and may detect the displacement as the Hall switch sensor is turned on by the movement of the magnet 220.

Further, the pedal travel sensor 320 used for the displacement detection method of the brake pedal may be a Hall integrated circuit. As the magnet 220 moves, the Hall integrated circuit may detect a change in magnetic flux and generate an electric signal corresponding to the change amount of the magnetic flux.

Through such a method, the displacement detection method for the brake pedal according to an embodiment of the present disclosure can reliably maintain the accuracy of the measurement of the displacement or stroke of the brake pedal.

To be more specific, the accuracy of measurement can be improved using the pedal travel sensor 320 having the plurality of detectors 321 and 322, and the measurement value measured by each of the plurality of detectors 321 and 322 of the pedal travel sensor 320 can be compared with the measurement value of the pedal wake up sensor 310, thus securing the reliability.

The above description is merely exemplary description of the technical scope of the present disclosure, and it will be understood by those skilled in the art that various changes and modifications can be made without departing from original characteristics of the present disclosure.

Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

---

[Detailed Description of Main Elements]

100: hydraulic block
101: displacement detection
system of brake pedal
110: shaft bore
120: cylinder bore
140: master cylinder
141: piston
142: pressure chamber
150: input rod
180: restoring spring
210: shaft
220: magnet
230: mounting member
300: displacement detection device
310: pedal wake up sensor
320: pedal travel sensor
321, 322: a plurality of detectors
350: printed circuit board
380: housing
700: control device

---

What is claimed is:

1. A displacement detection system for a brake pedal, the system comprising:
   a shaft moving in conjunction with a movement of the brake pedal;
   a magnet supported on a shaft to generate a magnetic field;

a displacement detection device detecting a change in magnetic flux according to a movement of the magnet; and
   a control device generating a brake control signal according to a measurement value of the displacement detection device,
   wherein the displacement detection device comprises:
   a pedal wake up sensor detecting the change in magnetic flux to generate a wake up signal for activating the control device; and
   a pedal travel sensor having a plurality of detectors that independently detect the magnetic flux, and detecting a change in magnetic flux to measure a stroke of the brake pedal, and
   wherein the control device verifies reliability of a measurement value that is measured by each of the plurality of detectors of the pedal travel sensor using a measurement value of the pedal wake up sensor.

2. The system of claim 1, wherein the control device compares the measurement values measured by the plurality of detectors of the pedal travel sensor when the measurement values are different from each other with the measurement value of the pedal wake up sensor to determine a highly reliable measurement value.

3. The system of claim 1, wherein the pedal wake up sensor detects displacement at each preset distance, and
   the control device compares the measurement value of the pedal wake up sensor with the measurement value measured by each of the plurality of detectors of the pedal travel sensor whenever the pedal wake up sensor detects the displacement, thus verifying the reliability.

4. The system of claim 1, wherein the control device determines that the detector in which the measurement value is generated is defective if the measurement value is generated among the plurality of detectors of the pedal travel sensor before the pedal wake up sensor generates a wake up signal.

5. The system of claim 1, wherein the pedal wake up sensor comprises a plurality of Hall switch sensors installed at a preset distance, and detects the displacement while the Hall switch sensor is turned on by the movement of the magnet.

6. The system of claim 1, wherein the pedal travel sensor is a Hall integrated circuit, and, as the magnet moves, the Hall integrated circuit detects a change in magnetic flux and generates an electric signal corresponding to a change amount of the magnetic flux.

7. The system of claim 1, wherein the displacement detection device further comprises:
   a printed circuit board on which the plurality of Hall switch sensors that are the pedal wake up sensor and the Hall integrated circuit that is the pedal travel sensor are mounted; and
   a housing accommodating the printed circuit board therein.

8. The system of claim 7, wherein the magnet moves while facing the plurality of Hall switch sensors and the Hall integrated circuit that are mounted on the printed circuit board.

9. The system of claim 1, wherein a plurality of magnets is arranged opposite to each other in a moving direction.

10. The system of claim 1, wherein the shaft and the magnet are accommodated in a shaft bore formed in a hydraulic block that is provided with a plurality of paths and valves to control a flow of a working fluid.

11. The system of claim 10, wherein the displacement detection device is mounted on an outside of the hydraulic block.

12. A displacement detection method for a brake pedal that detects a change in magnetic flux according to a movement of a magnet supported on a shaft moving in conjunction with a movement of the brake pedal to generate a magnetic field, the method comprising:

detecting the change in magnetic flux through a pedal wake up sensor to generate a wake up signal for activating the control device;

detecting a change in magnetic flux to measure a stroke of the brake pedal through a pedal travel sensor having a plurality of detectors that independently detect the magnetic flux; and verifying reliability of a measurement value that is measured by each of the plurality of detectors of the pedal travel sensor using a measurement value of the pedal wake up sensor.

13. The method of claim 12, wherein the measurement values measured by the plurality of detectors of the pedal travel sensor when the measurement values are different from each other are compared with the measurement value of the pedal wake up sensor to determine a highly reliable measurement value.

14. The method of claim 12, wherein the pedal wake up sensor detects displacement at each preset distance, and the measurement value of the pedal wake up sensor is compared with the measurement value measured by each of the plurality of detectors of the pedal travel sensor whenever the pedal wake up sensor detects the displacement, thus verifying the reliability.

15. The method of claim 12, wherein it is determined that the detector in which the measurement value is generated is defective if the measurement value is generated among the plurality of detectors of the pedal travel sensor before the pedal wake up sensor generates a wake up signal.

16. The method of claim 12, wherein the pedal wake up sensor comprises a plurality of Hall switch sensors installed at a preset distance, and detects the displacement as the Hall switch sensor is turned on by the movement of the magnet.

17. The method of claim 12, wherein the pedal travel sensor is a Hall integrated circuit, and, as the magnet moves, the Hall integrated circuit detects a change in magnetic flux and generates an electric signal corresponding to a change amount of the magnetic flux.

18. The method of claim 12, wherein the pedal wake up sensor comprises a plurality of Hall switch sensors mounted on a printed circuit board, and the pedal travel sensor is a Hall integrated circuit mounted on the printed circuit board.

19. The method of claim 18, wherein the magnet moves while facing the plurality of Hall switch sensors and the Hall integrated circuit that are mounted on the printed circuit board.

20. The method of claim 19, wherein a plurality of magnets is arranged opposite to each other in a moving direction.

\* \* \* \* \*